United States Patent
Kobayashi et al.

[11] Patent Number: 5,172,714
[45] Date of Patent: Dec. 22, 1992

[54] FUEL CHECK VALVE ASSEMBLY FOR FUEL TANK

[75] Inventors: Jiro Kobayashi; Harumitsu Sugiyama; Masakazu Miyoshi, all of Kanagawa, Japan

[73] Assignees: Nissan Motor Co., Ltd.; Kato Hatsujo Kaisha Limited, both of Yokohama, Japan

[21] Appl. No.: 799,939

[22] Filed: Nov. 29, 1991

[30] Foreign Application Priority Data

Nov. 30, 1990 [JP] Japan .................................. 2-338769
Nov. 30, 1990 [JP] Japan .................................. 2-338771

[51] Int. Cl.$^5$ ............................................. F16K 17/36
[52] U.S. Cl. .................................... 137/39; 137/43; 137/202
[58] Field of Search ........................ 137/39, 43, 202

[56] References Cited

U.S. PATENT DOCUMENTS

| | | | |
|---|---|---|---|
| 4,000,828 | 1/1977 | Crute | 137/43 X |
| 4,655,238 | 4/1987 | Szlaga | 137/43 |
| 5,004,002 | 4/1991 | Kobayashi | 137/39 |
| 5,028,244 | 7/1991 | Szlaga | 137/202 X |

FOREIGN PATENT DOCUMENTS

62-75278  5/1987  Japan .

*Primary Examiner*—Robert G. Nilson
*Attorney, Agent, or Firm*—Foley & Lardner

[57] ABSTRACT

A fuel check valve assembly for an automotive vehicle fuel tank includes a valve casing having a valve seat and a float valve movably installed in the valve casing for controlling opening and closing of the valve seat. The float valve consists of a valve float and a valve head cooperative with each other to define therebetween a sealingly closed chamber. The valve head is subjected on opposite sides thereof to a pressure within the sealingly closed chamber and a pressure within the fuel tank, respectively and movable relative to the valve float in response to a pressure differential across the valve head. The valve head is forced to move relative to the valve float and away from the valve seat to open the same when the pressure differential across the valve head is larger than a predetermined value.

22 Claims, 7 Drawing Sheets

FUEL CHECK VALVE ASSEMBLY FOR FUEL TANK

BACKGROUND OF THE INVENTION

1. Field of the Invention

The present invention relates to a fuel check valve assembly for use in a fuel tank of an automotive vehicle or the like.

2. Description of the Prior Art

As is well known, some automotive vehicle fuel tank is equipped with a fuel check valve assembly for preventing outflow of fuel from the fuel tank through a vent line of an evaporative emission control system when the surface of fuel inclines relative to the fuel tank. The fuel check valve assembly is installed within the fuel tank and includes a float valve which, when the surface of fuel inclines relative to the fuel tank and fuel is caused to flow into the fuel check valve assembly, moves upward by the effect of its buoyancy and closes a valve seat for thereby preventing outflow of fuel from the fuel tank through the vent line of the evaporative emission control system.

In such a prior art fuel check valve assembly, when the pressure differential between the inside of the fuel tank and the inside of the vent line becomes large, there arises a tendency that the float valve is kept sticking to the valve seat even after the fuel check valve assembly is drained off. In order to prevent such sticking of the float valve, it has been practiced to employ a large-sized and heavy float valve, thus leading to a problem of an increased weight of an automotive vehicle, etc.

In order to solve this problem, such a fuel check valve assembly as disclosed in Japanese Utility Model Provisional Publication No. 62-75278 has been proposed. This fuel check valve assembly is provided with a relief valve which, when the pressure differential between the inside of the fuel tank and the inside of the vent line of the evaporative emission control system increases beyond a predetermined value, opens for releasing fuel vapors from the fuel tank for thereby lowering the pressure within the fuel tank and preventing the float valve from sticking to the valve seat.

The pressure differential in response to which the relief valve is caused to open, needs to be set lower than the pressure differential (hereinafter referred to as stick pressure) in response to which the float valve is caused to stick to its valve seat. When the stick pressure of the float valve is low, such a case may occur in which normal closure of the float valve causes the relief valve to open. It is therefore desirable to set the stick pressure as high as possible. For this reason, the float valve is still necessitated to be large-sized and heavy. The fuel check valve assembly disclosed by the above described Japanese Patent Provisional Publication therefore cannot provide a means for solving the above noted problem completely.

SUMMARY OF THE INVENTION

In accordance with the present invention, there is provided a novel and improved fuel check valve assembly for a vehicle fuel tank, which comprises a valve casing installed in the fuel tank to form a passageway for providing communication between the inside and outside of the fuel tank, a valve seat integral with the valve casing and forming part of the passageway, and a float valve disposed within the valve casing and having a valve float movable toward and away from the valve seat by the effect of its buoyancy and weight, and a valve head movable relative to the valve float in response to a pressure differential across the valve seat and cooperative with the valve seat for controlling opening and closing of the valve seat.

The valve head is movable relative to the valve float to open the valve seat when the pressure differential exceeds a predetermined value.

This structure is effective for solving the above noted problem inherent in the prior art device.

It is accordingly an object of the present invention to provide a novel and improved fuel check valve assembly for a vehicle fuel tank which can assuredly prevent a float valve from sticking to a valve seat without making the float valve larger in size and heavier.

It is a further object of the present invention to provide a novel and improved fuel check valve assembly of the above described character which is compact in size and light in weight.

It is a further object of the present invention to provide an improved and novel fuel check valve assembly of the above described character which can forcedly separate the float valve away from the valve seat with a force that increases as a pressure within the fuel tank increases.

DETAILED DESCRIPTION OF THE PREFERRED EMBODIMENTS

Figure 1:
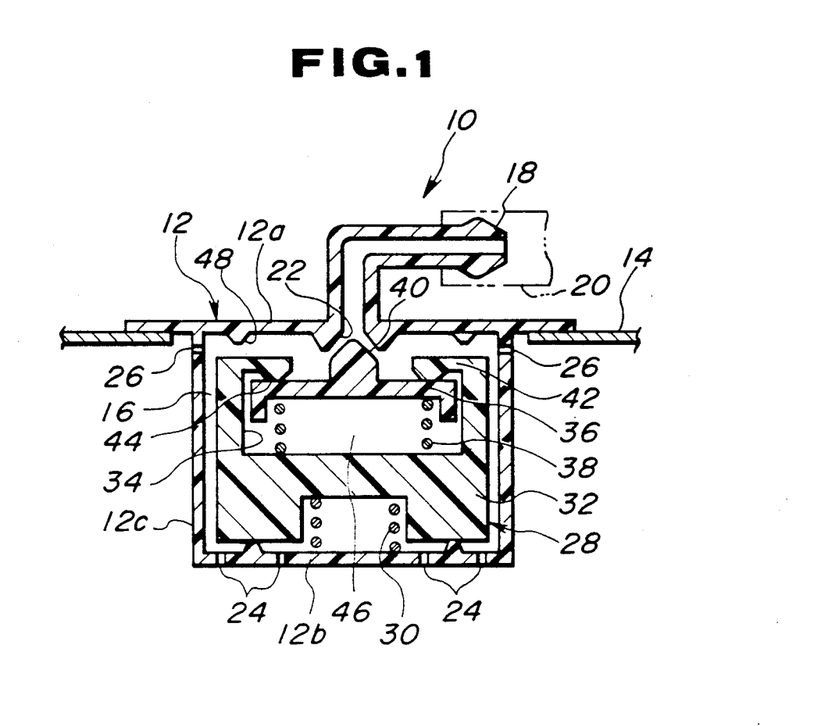
FIG. 1 is a sectional view of a fuel check valve assembly according to an embodiment of the present invention.
Figure 2:
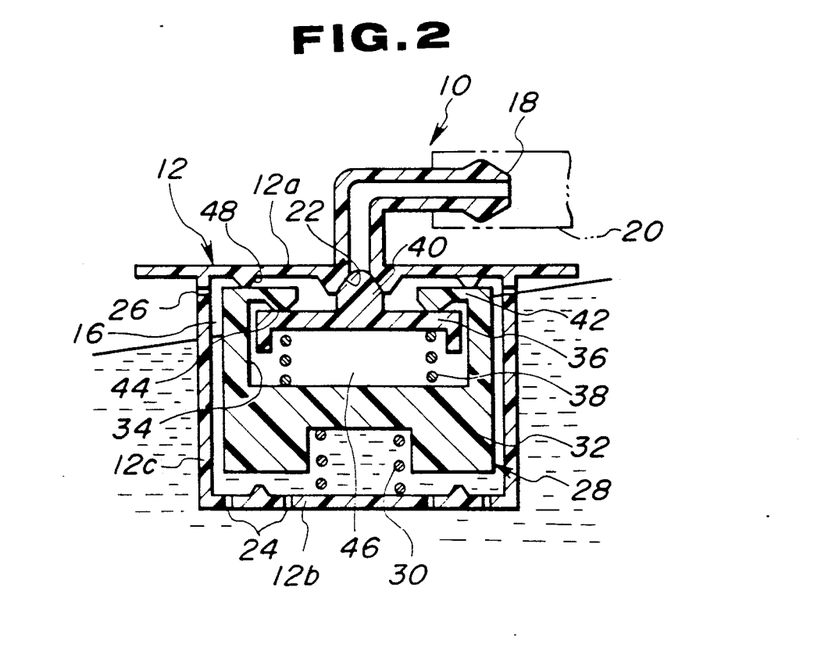
FIGS. 2 and 3 are views similar to FIG. 1 but show a float valve in different operating positions.
Figure 3:
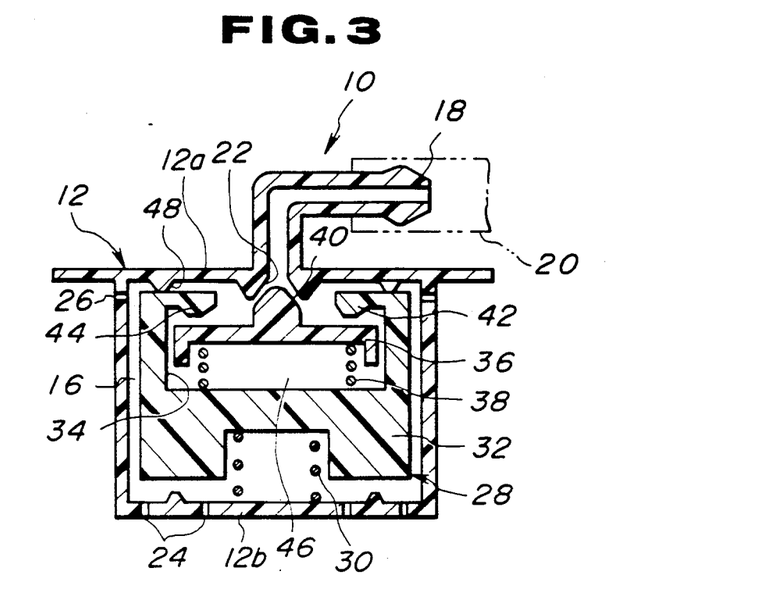

Referring first to FIGS. 1 to 3, a fuel check valve assembly is generally indicated by 10 and includes a hollow cylindrical valve casing 12 made of a synthetic resinous material, disposed inside of a fuel tank 14 and attached to a top wall of same. The valve casing 12 consists of a top wall 12a, bottom wall 12b and a hollow cylindrical side wall 12c and defining inside thereof a float valve chamber 16. The valve casing 12 further has an integral outlet pipe 18 which has an end portion concentric with the top wall 12a and integrally connected thereto for defining an outlet passage 18a in communication with the float valve chamber 16. The outlet pipe 18 has the other end portion for connection with a vent tube 20 for feeding fuel vapors in the fuel tank 14 to a carbon canister of an evaporative emmision control system (not shown). The valve casing 12 is formed with a valve seat 22 at the junction between the outlet passage 18a and the valve chamber 16. A plurality of openings 24 and 26 are respectively formed in the bottom wall 12b and the side wall 12c so that when the vehicle is turning or inclined to cause inclination of the surface of fuel relative to the fuel tank 14, fuel within the fuel tank 14 is caused to flow into the valve casing 12, i.e., into the float valve chamber 16 through the openings 24 and 26.

A float valve 28 is accommodated within the float valve chamber 16 and supported by a spring 30 upon the bottom wall 12b of the valve casing 12. When fuel flows into the float valve chamber 16, the float valve 28 is caused to move upward by the effect of its buoyancy and under the bias of the spring 30 to close the valve seat 22 for thereby obstructing communication between the outlet passage 18a and the float valve chamber 16, i.e., obstructing communication between the fuel tank 14 and the vent tube 20 of the evaporative emission control system.

The float valve 28 consists of a cylindrical valve float 32 having at the top a downward receding portion 34, a valve head 36 having a disk-like shape and installed in the receding portion 34 for reciprocation relative to the valve float 32 and a spring 38 interposed between the valve float 32 and the valve head 36 for urging the valve head 36 upward relative to the valve float 32. The valve head 36 has a concentric upward projection 40 cooperative with the valve seat 22 to control opening and closing of the same. The valve float 32 has at the upper end of the receding portion 34 an annular inward flange 42. The annular inward flange 42 has at the lower surface thereof an annular projection 44 for abutment upon the valve head 36 and thereby restricting upward movement of the valve head 36 relative to the valve float 32. When the valve head 36 is abuttingly engaged with the annular projection 44, a sealingly closed space 46 is defined between the receding portion 34 and the valve head 36. By this, the valve head 36 is movable away from the valve seat 22 and relative to the valve float 32 when a pressure differential across the valve head 36 is larger than a predetermined value and also movable upward under the bias of the spring 38 when the pressure differential across the valve head 36 is smaller than a predetermined value.

The top wall 12a of the valve casing 12 has at the lower surface thereof a plurality of projections 48 of a circular array for contact with the valve float 32 when the float valve 28 is moved into its uppermost position by the effect of its buoyancy.

In operation, when the vehicle is not turning or inclined but in an ordinary state, i.e., in a state of not causing any substantial inclination of the surface of fuel relative to the fuel tank 14, the float valve 28 within the float valve chamber 16 is held in its lowermost position by the effect of its weight, thus providing communication between the fuel tank 14 and the vent tube 20 through the float valve chamber 16, the valve seat 22 and the outlet passage 18a. In this connection, it is to be noted that the float valve chamber 16, the valve seat 22 and the outlet passageway 18a constitutes a passageway for providing communication between the inside and outside of the fuel tank 14.

When the vehicle is turning or inclined so as to cause inclination of the surface of fuel relative to the fuel tank 14 and thereby cause fuel to flow into the valve casing 12 through the openings 24 and 26, the valve float 32 moves upward by the effect of its buoyancy and under the bias of the spring 30 to cause the valve element 40 to close the valve seat 22 and simultaneously the valve float 32 to abut upon the projections 48 of the top wall 12a of the vale casing 12, thus obstructing communication between the fuel tank 14 and the vent tube 20 and thereby preventing outflow of fuel from the fuel tank 14 through the vent tube 20.

When the vehicle returns from such a turning or inclined state to the aforementioned ordinary state, fuel flows out from the valve casing 12 through the openings 24, i.e., the valve casing 12 is drained off. In this instance, when the pressure differential between the inside of the fuel tank 14 and the inside of the vent tube 20 is small, the float valve 28 moves downward into its lowermost position by the effect of its weight in the instant of the valve casing 12 being drained off. However, when the pressure differential between the inside of the fuel tank 14 and the inside of the vent tube 20 is large, there may occur such a case in which the valve float 28 is kept sticking to the valve seat 22 as shown in FIG. 2 even after the valve casing 12 is drained off. When such is the case, the pressure differential across the valve head 36 increases as the pressure within the fuel tank 14 increases. By such an increased pressure differential, while the valve float 32 is held in contact with the projections 48 of the top wall 12a of the valve casing 12, the valve head 36 is forcedly moved downward against the bias of the spring 38 and thereby separated away from the valve seat 22, thus releasing the float valve 28 from a sticking state and allow the same to move downward into its lowermost position by the effect of its weight and establishing communication between the fuel tank 14 and the vent tube 20.

Figure 4:
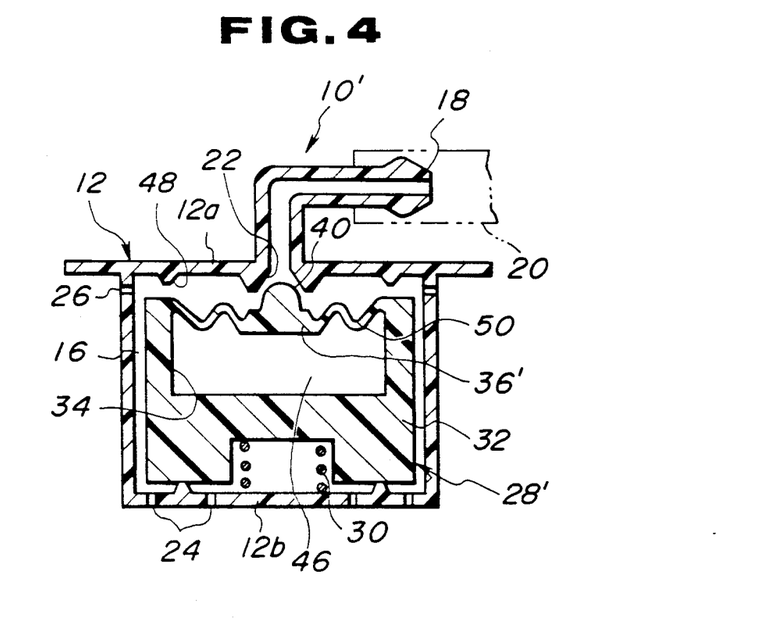
FIG. 4 is a sectional view of another embodiment of the present invention.
Figure 5:
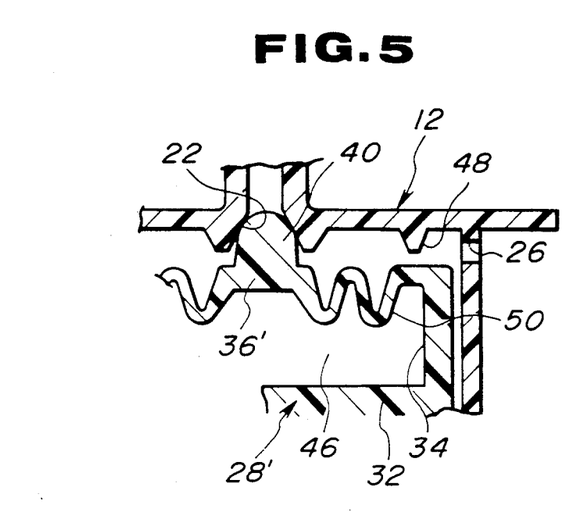
FIGS. 5 and 6 are enlarged fragmentary sectional views of the embodiment of FIG. 4, with a float valve in different operating positions.
Figure 6:
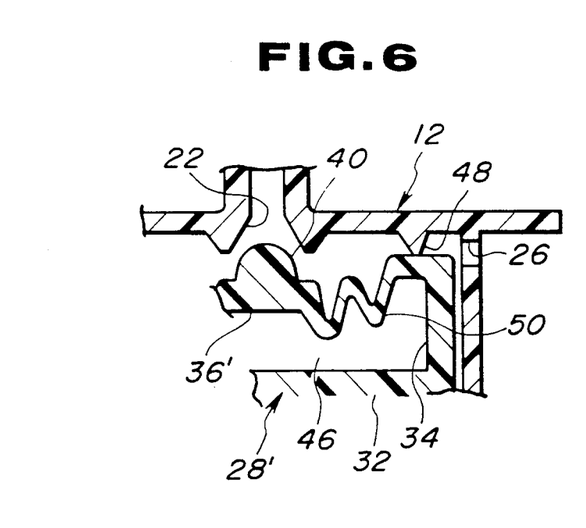

Referring to FIGS. 4 to 6 in which parts and portions like or corresponding to those of the previous embodiment of FIGS. 1 to 3 are designated by the same reference characters, the check valve assembly 10' according to this embodiment will be described. This embodiment differs from the previous embodiment in that the valve float 32 and the valve element 32 are interconnected by an annular, radially waved, springy thin plate 50, that the valve float 32, valve head 36' and the thin plate 50 are formed from a synthetic resinous material to constitue the float valve 28' of a sigle piece or an integral unit, and that the space 46 is permanently sealingly closed and the valve head 36, is resiliently movably supported upon the valve float 32.

In operation, when inclination of the surface of fuel relative to the fuel tank 14 causes fuel to flow into the valve casing 12 and thereby the float valve 28 to move upward by the effect of its buoyancy and under the bias of the spring 30, the valve head 36' is caused to close the valve seat 22 as shown in FIG. 5 for thereby preventing outflow of fuel from the fuel tank 14 through the vent tube 20.

When the inclination of the surface of fuel relative to the fuel tank 14 is eliminated to cause fuel to flow out from the valve casing 12 and thereby the same to be drained off and the pressure within the fuel tank 14 further increases, the thin plate 50 is caused to flex by the effect of the pressure differential between the inside of the float valve chamber 16 and the sealingly closed space 46 in such a way as to first cause the valve float 32 to abut upon the projections 48 and then cause the valve head 36' to move downward relative to the valve float 32 to open the valve seat 22 as shown in FIG. 6.

Figure 7:
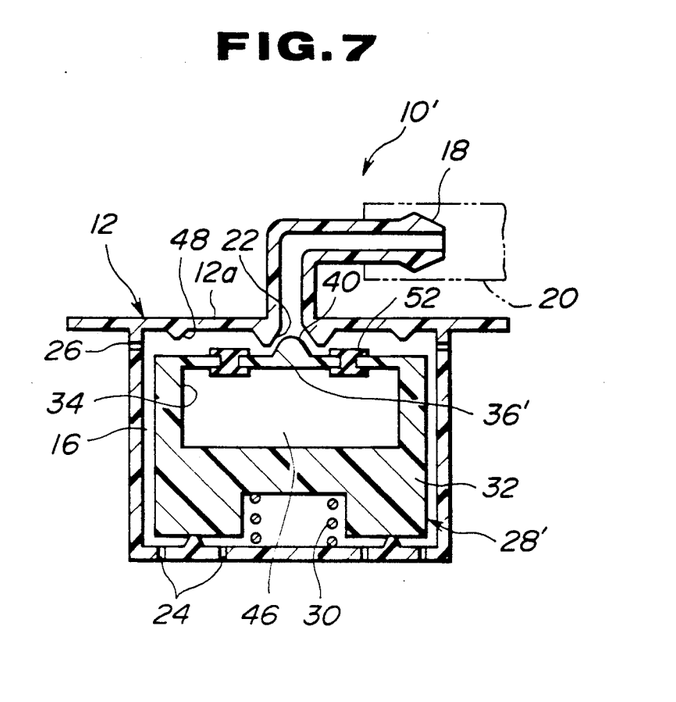
FIG. 7 is a sectional view of a further embodiment of the present invention.

FIG. 7 shows a further embodiment which differs from the previous embodiment of FIGS. 4 to 6 in that the valve float 32 and the valve head 36' are independent parts and that an annular elastic rubber member 52 is interposed between the valve float 32 and the valve head 36' to resiliently interconnect the both. This embodiment can produce substantially the same effect as the previous embodiment of FIGS. 4 to 6.

Figure 8:
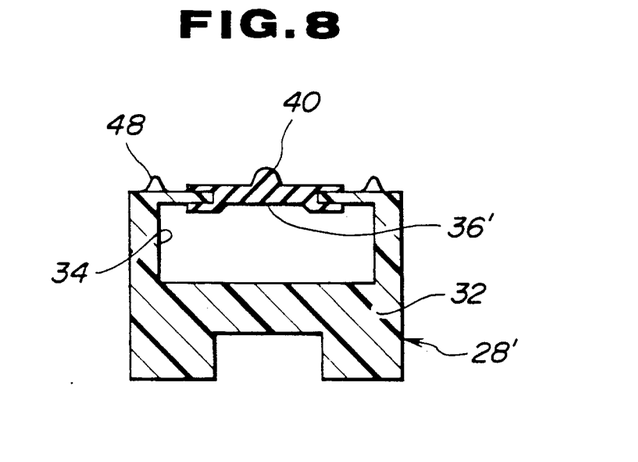
FIG. 8 is a sectional view of a float valve according to a further embodiment of the present invention.

FIG. 8 shows a further embodiment which differs from the previous embodiment of FIGS. 4 to 6 in that the valve head 36' is entirely made of an elastic rubber material and secured at its outer peripheral portion to the valve float 32 and that the projections 48 are provided to the valve float 32 of the float valve 28. This embodiment can produce substantially the same effect as the previous embodiment of FIGS. 4 to 6.

Figure 9:
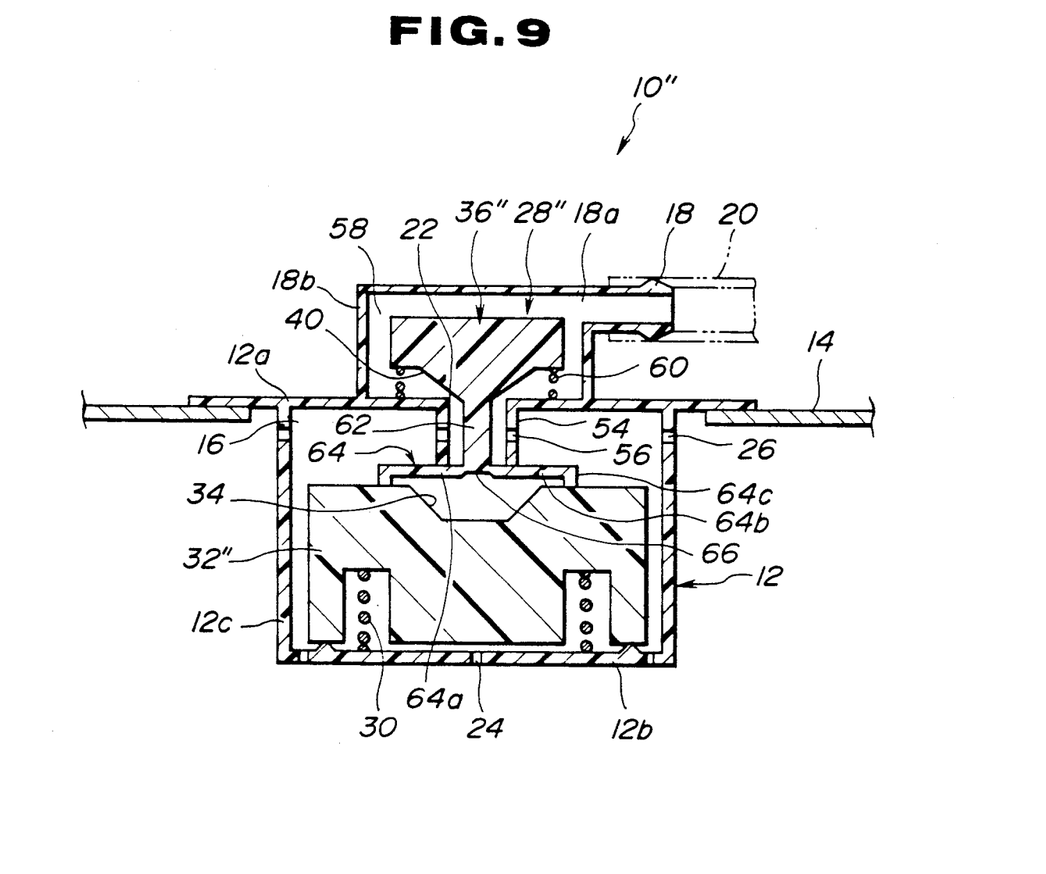
FIG. 9 is a view similar to FIG. 1 but shows a further embodiment of the present invention.
Figure 10:
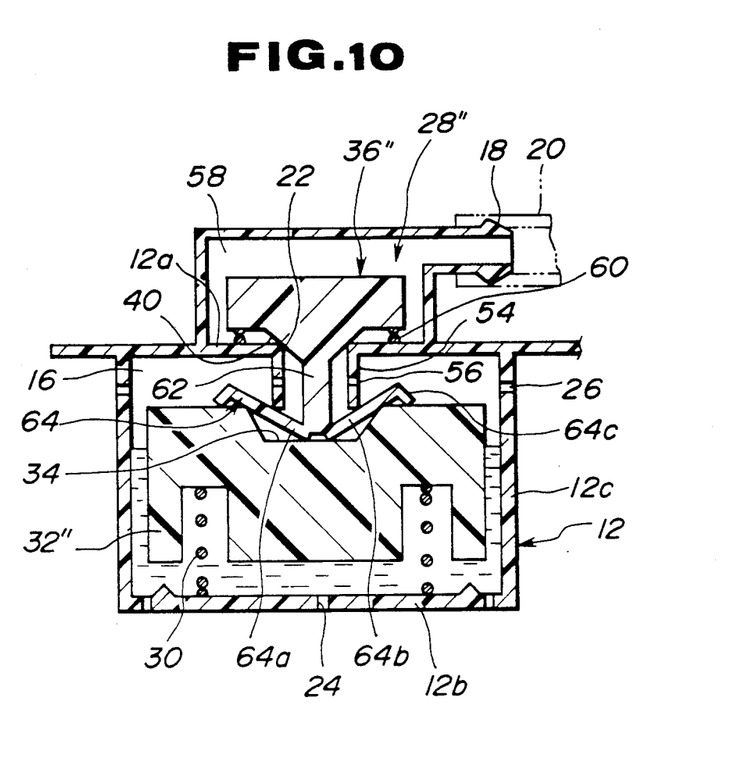
FIG. 10 is a view similar to FIG. 9 but shows a float valve in a different operating position.

Referring to FIGS. 9 and 10 in which like or corresponding parts to those of the previous embodiment of FIGS. 1 to 3 are designated by the same reference characters, a fuel check valve assembly 10" according to a further embodiment will be described. In this embodiment, the top wall 12a of the valve casing 12 has an integral concentric tubular support 54 projecting inward of the float valve chamber 16. The tubular support 54 is formed with a plurality of radial openings 56.

The outlet pipe 18 has an increased diameter end portion 18b concentric with the top wall 12a and is formed at the increased diameter end portion 18b with another valve chamber 58 constituting part of the outlet passage 18a. The valve head 36" of the float valve 28" has a poppet-like shape and includes a head portion 40 accommodated in the valve chamber 58 and resiliently supported by a spring 60 upon the top wall 12a of the valve casing 12, a leg portion 62 elongated downward from the head portion 40 and through the tubular support 54 to have a lower end projecting downward from the tubular support 54, and a lever portion 64 consisting of first and second lever arms 64a and 64b elongated in opposite directions from the lower end of the leg portion 62 and transversely of the tubular support 54. The lever portion 64 is capable of being bent into a V-like shape in response to upward movement of the valve float 32" for making the lever arms 64a and 64b cooperate with the tubular support 54 to drive the leg portion 62 and the head portion 40 downward and thereby cause the head portion 40 to close the valve seat 22. To this end, the lever portion 64 is elongated more than the outer diameter of the tubular support 54 and formed with a cut between the first and second lever arms 64a and 64b for facilitating bending of the lever portion 64. The first and second lever arms 64a and 64b of the lever portion 64 have downwardly bent remoter ends 64c and are held horizontal or horizontally straight while contacting the lower end of the tubular support 54.

When the valve float 32" is in its lowermost position, the lever portion 64 is held horizontally straight while contacting the lower end of the tubular support 54 under the bias of the spring 60. When this is the case, the head portion 40 of the valve head 36" is in a position of being spaced away from the valve seat 22, i.e., in a position of opening the valve seat 22. When, however, the valve float 32" is moved into its uppermost position as shown in FIG. 10 by the effect of its buoyancy and under the bias of the spring 30, the lever portion 64 is flexed or bent into a V-like shape to cause each lever arms 64a and 64b separated by the cut 66 to cooperate with the lower end of the tubular support 54 to drive the leg portion 62 and the head portion 40 downward against the bias of the spring 60 and thereby cause the head portion 40 to close the valve seat 22.

In operation, when inclination of the surface of fuel relative to the fuel tank 14 causes fuel to flow into the valve casing 12, the valve float 32 moves upward by the effect of its buoyancy and under the bias of the spring 30 for thereby pushing the opposite end portions 64c of the lever portion 64 upward and bending the same into a V-like shape. When bent into such a V-like shape, the lever portion 64 causes the head portion 40 to move downward against the bias of the spring 60 and close the valve seat 22. In the meantime, as the lever portion 64 is bent much more, the joining portion between the lever arms 64a and 64b projects more downward. This downward projection of the lever portion 64 is permitted by the receding portion 34 formed in the valve float 32".

When the valve head 36" is kept sticking to the valve seat 22 even after drainage of the valve casing 12, it is urged upward, i.e., urged away from the valve seat 22 with an increasing force as the pressure within the fuel tank 14 increases since the pressure within the fuel tank 14 is supplied through the openings 56 of the tubular support 54 to act on the lower surface of the valve head 36". In this connection, it is to be noted that the valve head 36" has opposite sides and is subjected at one of the opposite sides to the pressure within the fuel tank 14 and on the other of the opposite sides to the pressure within the outlet passage 18 or the vent tube 20 and is movable relative to the valve float 32 in response to a pressure differential across the valve head 36". When the vehicle is overturned, the valve float 32" causes the leg portion 64 to be bent by the effect of its weight and under the bias of the spring 30 for thereby causing the valve head 36" to close the valve seat 22. This embodiment can produce substantially the same effect as the previous embodiment of FIGS. 1 to 3.

Figure 11:
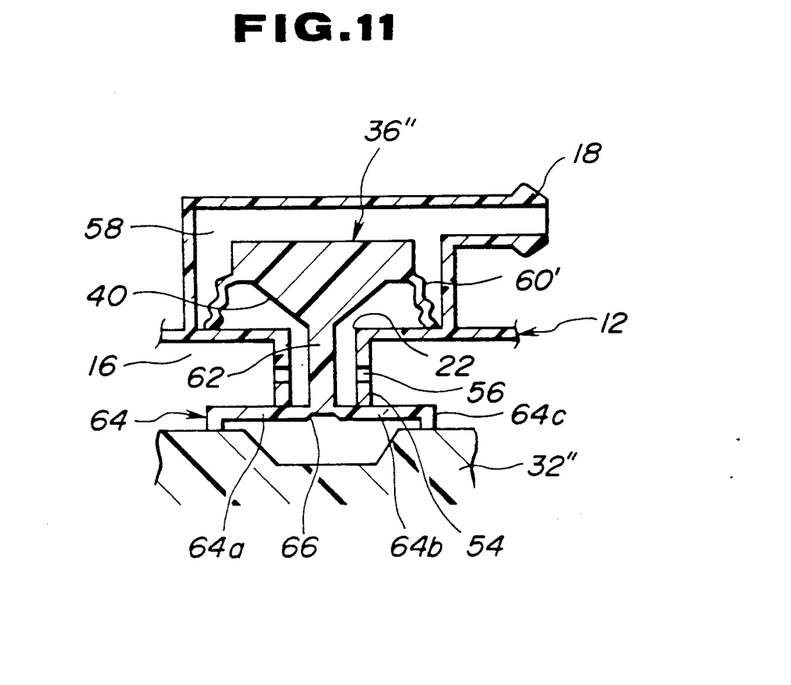
FIGS. 11 to 13 are sectional views of further embodiments of the present invention.
Figure 12:
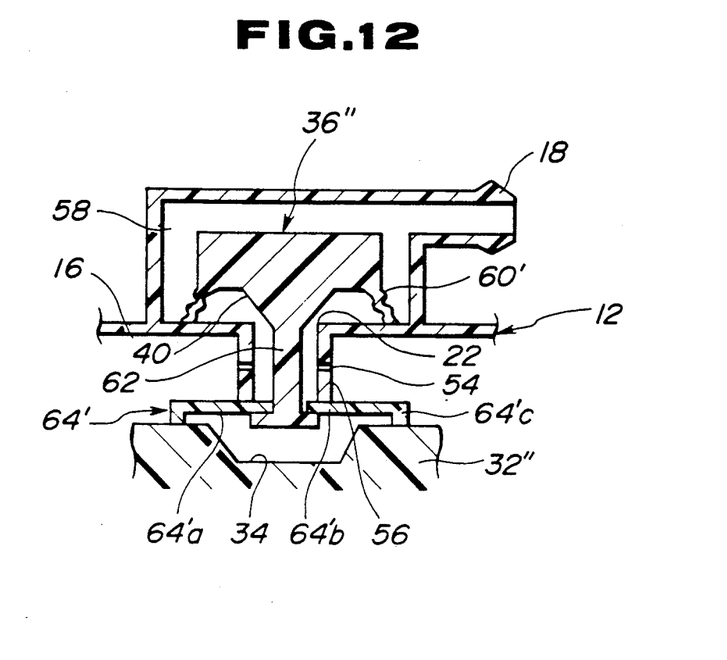
Figure 13:
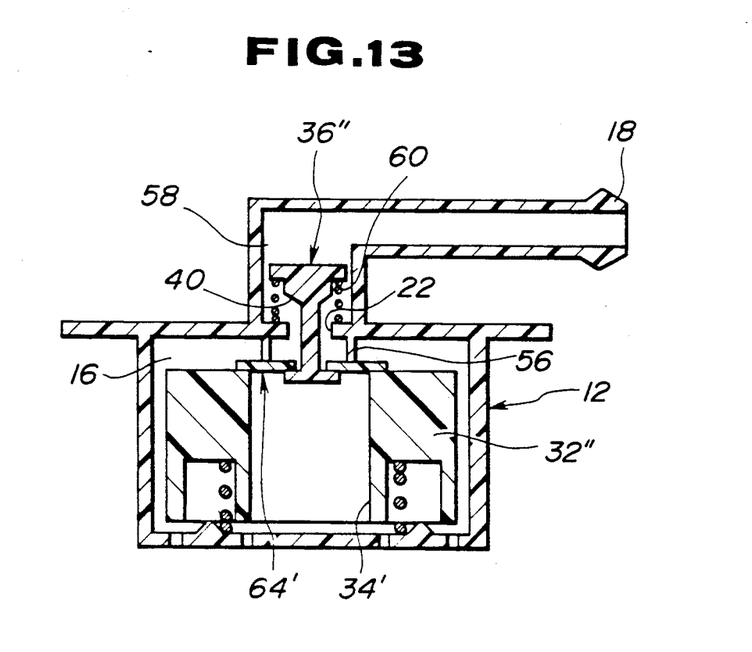

FIGS. 11 to 13 show variants of the embodiment of FIGS. 9 and 10. As shown in FIG. 11, the spring 60 may be replaced by an integral corrugated portion 60' of the valve head 36. As shown in FIG. 12, the lever portion 64 may be replaced by a lever 64' independent from the leg portion 62. As shown in FIG. 13, the receding portion 34 of the valve float 32" may be replaced by a through hole 34'.

What is claimed is:

1. A fuel check valve assembly in a fuel tank of a vehicle, comprising:
   a valve casing installed in the fuel tank to form a passageway for providing communication between the inside and outside of the fuel tank;
   a valve seat integral with said valve casing and forming part of said passageway; and
   a float valve disposed within said valve casing and having a valve float movable toward and away from said valve seat by the effect of its buoyancy and weight, and a valve head movable relative to said valve float in response to a pressure differential across said valve seat and cooperative with said valve seat for controlling opening and closing of said valve seat;
   said valve head being movable relative to said valve float to open said valve seat when said pressure differential exceeds a predetermined value;
   wherein said valve float has at an upper end thereof a downward receding portion cooperative with one of opposite sides of said valve head to define therebetween a sealingly closed chamber.

2. A fuel check valve assembly according to claim 1, wherein said valve head is subjected at the other of said opposite sides to a pressure within the fuel tank.

3. A fuel check valve assembly according to claim 2, wherein said valve head has a disk-like shape and is movably installed in said receding portion of said valve float.

4. A fuel check valve assembly according to claim 3, wherein said valve head has a concentric upward projection for contact with said valve seat.

5. A fuel check valve assembly according to claim 4, further comprising first abutment means for abuttingly engaging said valve float and said valve casing with each other and thereby limiting upward movement of said valve float relative to said valve casing, and second abutment means for abuttingly engaging said valve head and said valve float with each other and thereby limiting upward movement of said valve head relative to said valve float, said projection of said valve head being held in contact with said valve seat to close the same when said valve float and said valve head are abuttingly engaged with said valve casing and said valve float by way of said first and second abutment means, respectively.

6. A fuel check valve assembly according to claim 5, wherein said valve casing is generally hollowly cylindrical and consists of a top wall, a bottom wall and a hollow cylindrical side wall between said top wall and said bottom wall, said first abutment means comprising a plurality of projections of a circular array formed in said top wall of said valve casing.

7. A fuel check valve assembly according to claim 6, wherein said valve float is cylindrical and concentrically formed with said receding portion of a circular cross section, said valve float having at an upper end of said receding portion an annular inward flange, said second abutment means comprising an annular projection formed in said inward flange of said valve float.

8. A fuel check valve assembly according to claim 5, further comprising first biasing means interposed between said valve head and said valve float for urging said valve head against said annular projection formed in said flange of said valve float and second biasing means interposed between said valve float and said bottom wall of said valve casing for urging said valve float against said top wall of said valve casing, said first biasing means holding said valve head in contact with said valve float by way of said second abutment means when a pressure differential across said valve head is lower than a predetermined value, said second biasing means holding said valve float in contact with said top wall of said valve casing by way of said first abutment means, being assisted by a buoyancy exerted on said valve float when said valve casing is supplied with a quantity of fuel larger than a predetermined value.

9. A fuel check valve assembly according to claim 8, wherein said valve casing has a float valve chamber and an integral outlet pipe having an outlet passage in communication with said float valve chamber by way of said valve seat, said float valve being installed in said float valve chamber, said float valve chamber and said outlet passage forming part of said passageway.

10. A fuel check valve assembly according to claim 2, wherein said valve head has a disk-like shape and a concentric projection cooperative with said valve seat for controlling opening and closing of said valve seat, said valve float being cylindrical and concentrically formed with said receding portion of a circular cross section, said float valve having a springy plate interconnecting said upper end of said valve float and said valve head for defining said sealingly closed chamber which is closed permanently.

11. A fuel check valve assembly according to claim 10, wherein said valve float, said valve head and said springy plate are integral with each other.

12. A fuel check valve assembly according to claim 11, further comprising abutment means for limiting upward movement of said valve float toward said valve casing, said valve float being abuttingly engaged with said valve casing by way of said abutment means when said projection of said valve head is moved away from said valve seat to open the same in response to a pressure differential across said valve head.

13. A fuel check valve assembly according to claim 10, wherein said springy plate is formed independently from said valve float and said valve head.

14. A fuel check valve assembly according to claim 10, wherein said springy plate is formed integral with said valve head and independently from said valve float.

15. A fuel check valve assembly in a fuel tank of a vehicle, comprising:
a valve casing installed in the fuel tank to form a passageway for providing communication between the inside and outside of the fuel tank;
a valve seat integral with said valve casing and forming part of said passageway; and
a float valve disposed within said valve casing and having a valve float movable toward and away from said valve seat by the effect of its buoyancy and weight, and a valve head movable relative to said valve float in response to a pressure differential across said valve seat and cooperative with said valve seat for controlling opening and closing of said valve seat;
said valve head being movable relative to said valve float to open said valve seat when said pressure differential exceeds a predetermined value;
wherein said valve casing is generally hollowly cylindrical and has a top wall, a bottom wall and a hollow cylindrical side wall, said top wall having a concentric tubular support projecting downward therefrom, said valve casing having an integral outlet pipe defining an outlet passage forming part of said passageway, said outlet passage having an increased diameter portion arranged concentrically of said valve casing, said valve head having a poppet-like shape and having a head portion movably received in said increased diameter portion, a leg portion extending downward from said head portion and through said tubular support to have a lower end projecting downward from said tubular support, and a lever portion consisting of first and second lever arms extending in opposite directions from said lower end of said leg portion and transversely of said tubular support, said lever portion being bendable into a V-like shape in response to upward movement of said valve float for making said lever arms cooperate with said tubular support to drive said leg portion and said head portion downward and thereby cause said head portion to close said valve seat, said tubular support being formed with an opening for subjecting one of opposite sides of said valve head to a pressure within the fuel tank.

16. A fuel check valve assembly according to claim 15, wherein said valve head is subjected at the other of said opposite sides to a pressure within said outlet passage.

17. A fuel check valve assembly according to claim 16, further comprising first biasing means interposed between said top wall of said valve casing and said head portion of said valve head for holding said valve head in a position of opening said valve seat when said valve casing is drained off, and second biasing means interposed between said bottom wall of said valve casing and said valve float for holding said valve float in a position of causing said lever portion of said valve head to be bent into said V-like shape, being assisted by a buoyancy exerted on said valve float when said valve casing is supplied with a quantity of fuel larger than a predetermined value.

18. A fuel check valve assembly according to claim 17, wherein said valve float has at an upper end a concentric receding portion for allowing said lever to be bent into said V-like shape.

19. A fuel check valve assembly according to claim 18, wherein said first and second lever arms of said valve head have downwardly bent remote ends so that said lever is held horizontally straight while contacting at said bent ends with the upper end of said valve float when said valve float is in its lowermost position.

20. A fuel check valve assembly according to claim 15, wherein said valve head, said leg portion and said lever are formed integral with each other, said lever being formed with a cut between said first and second lever arms.

21. A fuel check valve assembly according to claim 18, wherein said first biasing means comprises a resiliently deformable annular member formed integral with said valve head.

22. A fuel check valve assembly according to claim 18, wherein said lever is formed independently from said leg portion of said valve head and interposed between said tubular support and said lower end of said leg portion.

* * * * *